UNITED STATES PATENT OFFICE.

DAVID M. MEFFORD, OF TOLEDO, OHIO.

PROCESS FOR PRESERVING FRUITS.

SPECIFICATION forming part of Letters Patent No. 226,094, dated March 30, 1880.

Application filed January 30, 1880.

*To all whom it may concern:*

Be it known that I, DAVID M. MEFFORD, of the city of Toledo, in the county of Lucas and State of Ohio, have invented a new and useful Process for Preserving Fruit, which process is fully set forth in the following specification.

This invention relates to the preservation of fruits, such as apples, pears, and quinces; and the process consists in subjecting such fruits when in a state of ripeness, hereinafter described, to the action of carbonic-acid gas or carbon dioxide by forcing said gas into the fruits by pressure until they are thoroughly impregnated with the same.

Hitherto it has been the practice to treat fruits in a table-ripe condition with carbonic-acid gas or carbon dioxide either at ordinary or by extreme pressure; but I find by experience that such practice is unfavorable to its preservation, and that fruit in that condition of ripeness passes on to decay. My process is therefore applied to fruits in only what is known as the "tree-ripe" condition.

It is necessary in preserving fruits by this process that at the time they are impregnated with carbonic-acid gas or carbon dioxide they should be only tree-ripe, which is the condition of winter apples at the time they are gathered in the fall, or of pears when taken off the trees in a hard but matured state, to be laid away to ripen up. In the above instances they are fully grown and their seeds ripe and brown, yet they have not passed through the chemical change necessary to make them mellow and to fully develop their flavor; and although this process can be applied to fruits at any time before said chemical change takes place it cannot be successfully done afterward.

To carry out my invention it is only necessary to thoroughly impregnate the fruit when in the above-described condition with carbonic-acid gas or carbon dioxide, and this can be done in various ways; but for convenience, cheapness, and speed I take a strong metallic receiver, of suitable size, that is provided with a lid that can be securely fastened down, so as to make the joint air-tight.

The vessel or receiver should be supplied with a stop-cock, to which I can attach a hose or pipe, in order that a carbonic-acid-gas or carbon-dioxide generator can be put in connection with the receiver. A generator such as is used at bottling-works or for charging soda-fountains, having a gas-purifying attachment, whereby the gas is passed through water, makes a convenient arrangement. The fruit being placed in the receiver, the lid securely fastened down, and connection made between the generator and receiver by means of the hose or pipe, the gas is generated and forced through the hose or pipe into the receiver, where it penetrates and impregnates the fruit.

The time required for thoroughly impregnating the fruit with the gas depends, of course, upon its intensity of pressure. If eighty or one hundred pounds to the square inch be exerted, the fruit will be sufficiently impregnated almost instantly.

Another good way to secure the desired impregnation of the fruit with carbonic-acid gas or carbon dioxide is to put the receiver containing the fruit in connection with a soda-fountain charged with carbonic-acid gas or carbon dioxide and water; but this plan makes rather disagreeable work, and therefore I prefer to use the gas in an anhydrous state.

As soon as the fruit is sufficiently impregnated with the gas, which, with a pressure of sixty or seventy pounds to the square inch, takes but a few minutes, (the pressure being determinable by means of a gas gage or meter attached to the generator,) the fruit can be taken out of the receiver; but care should be taken to let the gas out of the receiver slowly, for if the gas is allowed to escape rapidly by turning the key of the stop-cock, so as to throw the throttle wide open, much of the fruit will be bursted.

Fruits that have once been impregnated with carbonic-acid gas or carbon dioxide when only tree-ripe will remain for months unchanged in flavor or appearance after similar fruits that have not been thus treated will have become entirely decayed; and although they may not be so desirable for eating in a raw condition as highly-ripe and mellow fruits, yet for pies or other culinary purposes they are all that can be desired.

I am aware of the various patents showing the uses of carbonic-acid gas or carbon dioxide in preserving fruits and vegetables, both with and without pressure in closed vessels, such articles being kept in the presence of the gas until used. I am also aware that carbonic-acid gas has been forced into grain for the purpose of killing the insects therein, and that the gas has been passed through flour prior to packing to assist in its preservation, all of which are not of the nature of my invention, and I therefore restrict myself to the application of said gas to fruits when in what is known as the "tree-ripe" condition, they then being removed from the receiver immediately after impregnation, as stated.

What I claim as my invention is—

The process of preserving fruits which consists in subjecting such fruits, in a tree-ripe condition, to carbonic-acid gas or carbon dioxide under pressure until saturated therewith, and then removing the fruit from the presence of the gas in the receiver, as stated.

DAVID M. MEFFORD.

Witnesses:
C. S. CURTIS,
GEO. VETTER.